Nov. 26, 1929.  S. F. ANDERSON  1,736,992
SLAB CUTTER
Filed Nov. 11, 1926  2 Sheets-Sheet 1
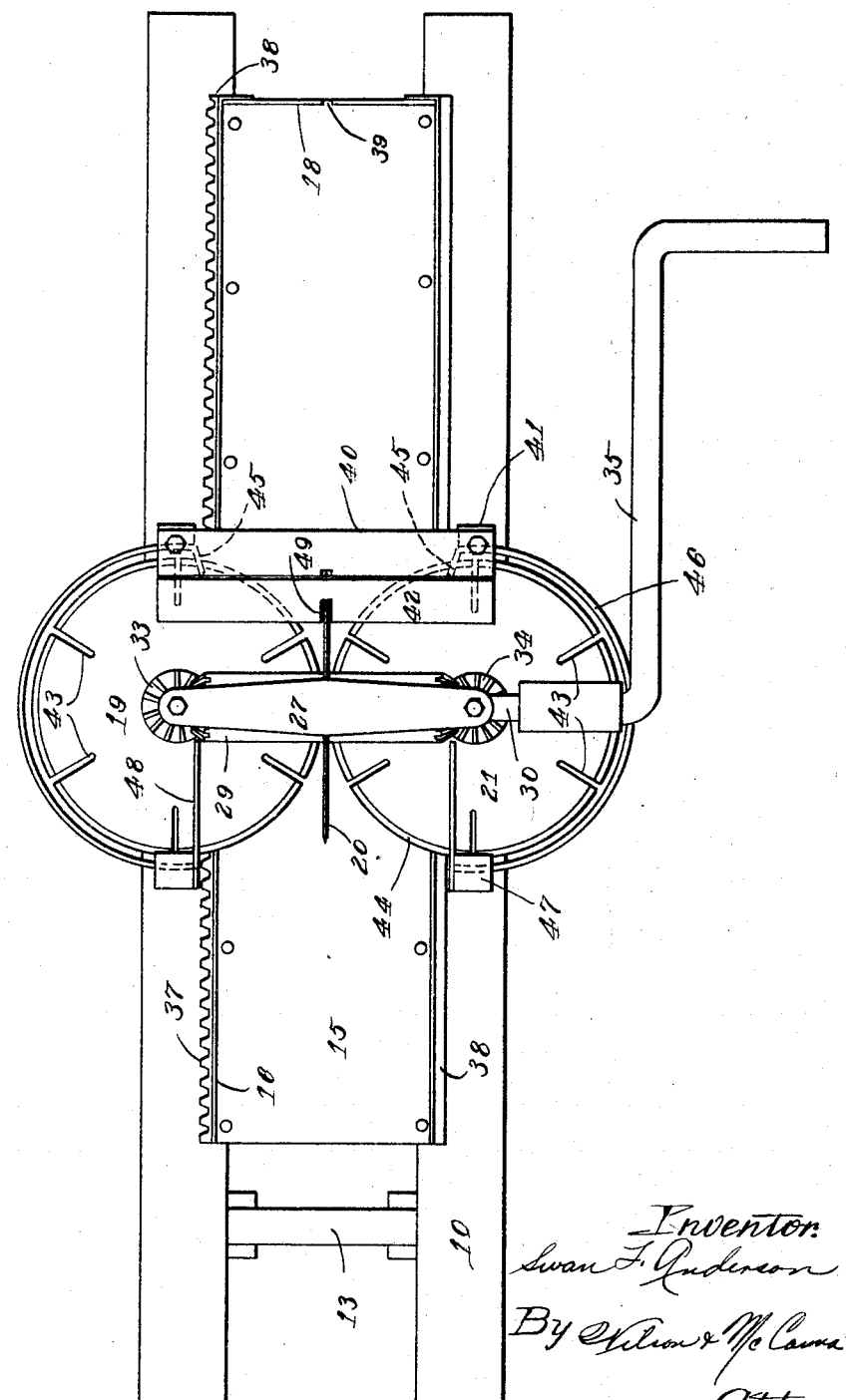

Nov. 26, 1929. S. F. ANDERSON 1,736,992
SLAB CUTTER
Filed Nov. 11, 1926 2 Sheets-Sheet 2
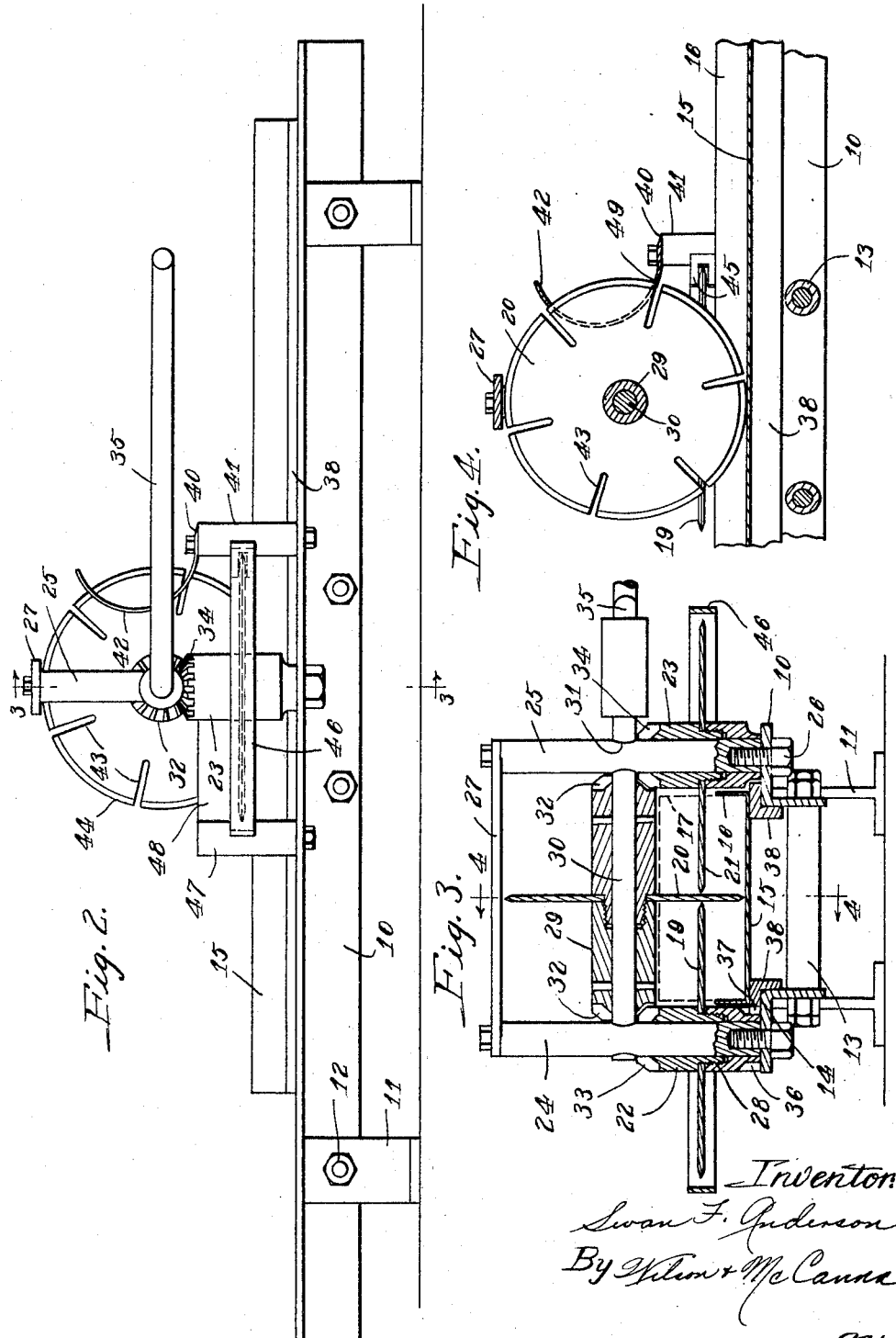

Patented Nov. 26, 1929

1,736,992

UNITED STATES PATENT OFFICE

SWAN F. ANDERSON, OF ROCKFORD, ILLINOIS, ASSIGNOR TO ANDERSON BROS. MFG. CO., OF ROCKFORD, ILLINOIS, A CORPORATION OF ILLINOIS

SLAB CUTTER

Application filed November 11, 1926. Serial No. 147,630.

This invention relates to a slab cutting machine capable of a wide range of uses but especially designed and intended for use in cutting large slabs of ice cream into small, uniform slabs of a size suitable for use in machines for making the ice cream confection known as Eskimo pies.

The principal object of the present invention is to provide a simple and practical machine for the purpose stated which will perform the work quickly and easily without compressing or squashing the cream as well as without waste, the slabs produced being given a clean, smooth cut on all sides and being absolutely uniform in size.

According to the present invention, I provide three cutters so arranged as to quarter the slab lengthwise as the cutters are revolved and the slab simultaneously fed thereto. Thus the cutting operation does not rely merely on the pressure of the cream against the cutters and the harmful compression of the cream is avoided.

A special feature of the machine consists in providing a skimming blade operating to trim off excess cream from the top of the slab as it is fed to the cutters so as to bring the same to a normal predetermined uniform size.

Another special feature consists in providing cutting blades slotted or kerfed radially to provide separately resilient segments which, in the event of a tendency for any particular segment to operate askew in the frozen ice cream, will maintain the cut along a predetermined line and produce a straight, smooth cut from end to end of the slab. In conjunction with the blades, I provide guides which prevent the deflection of the segments just before they enter the slab as the cutters revolve so that each segment is guided for operation along a predetermined line and is unaffected by any possible deflection of a neighboring segment operating in the slab. The combination of the specially slotted or kerfed blades with the guides therefor insures a straight, clean cut even though the slab of ice cream may be frozen quite hard and would otherwise be difficult to cut properly.

These and other objects and advantages of the present invention will appear in the course of the following specification in which reference is made to the accompanying drawings, wherein—

Figure 1 is a plan view of a slab cutting machine made in accordance with my invention;

Fig. 2 is a side view of Fig. 1;

Fig. 3 is a vertical cross-section taken on the line 3—3 of Fig. 2, looking in the direction of the arrows; and Fig. 4 is a fragmentary, longitudinal, vertical section taken in the plane of the line 4—4 of Fig. 3, looking in the direction indicated by the arrows.

The same reference numerals are applied to corresponding parts throughout the views.

The machine, as will be observed, is rather sturdily built to withstand hard usage and has a heavy frame or base provided by angle iron side members 10 to which the legs 11, for bolting the machine to a table, are suitably bolted as at 12. The side members 10 are rigidly spaced by cross-members 13 so as to provide suitable ways at 14 for a pan 15 to move endwise of the frame. The pan 15 is provided of a width to receive a standard eight quart slab when the same is removed from its mold. The pan is preferably removable endwise from the machine to receive the slab. The side walls 16 of the pan 15 position the slab, such as that indicated by dotted lines at 17 in Fig. 3, while an end wall 18 holds the slab against endwise movement with respect to the pan in the operation of the machine. The purpose of the machine, as stated above, is to cut the eight quart slab lengthwise into four uniform slabs of a size suitable for use in machines for making the ice cream confection known as Eskimo pies. The three blades 19, 20, and 21, serve to quarter the slab 17 in a manner which perhaps appears most clearly in Fig. 3, the blades 19 and 21 being horizontally disposed to cut the slab lengthwise midway of the height thereof, while the blade 20 is vertically disposed and operates in a plane between the cutting edges of the other two blades and cuts the slab endwise midway of the width thereof. The blades 19, 20, and 21, are operated in unison, as will presently appear, and the pan 15 is simultaneously moved endwise to advance the slab to the blades for the cutting operation. Thus, the cutting does not rely on mere pressure of the slab of cream against the cutters and consequently any harmful compression or squashing of the cream is avoided. At the same time, a clean, smooth cut is produced on all sides of the slabs and without any waste of cream. Before proceeding with the description it may be well to note that, while special reference is made to the use of the machine in cutting slabs of ice cream, it will be obvious that it is not at all limited to this particular use but might be used in cutting slabs of any other material having substantially the same characteristics as ice cream from the standpoint of cutting, such, for example, as cheese, butter, soap and other materials frequently produced in slabs. The means for revolving the blades and for simultaneously moving the pan will now be described.

The blades 19 and 21 are mounted on hubs 22 and 23, respectively, which in turn are rotatably mounted on posts 24 and 25, respectively. The latter are bolted to the side members 10 of the frame, as at 26, and are fixedly spaced at their upper ends by a cross-member 27. The hubs 22 and 23 are each formed in two parts threadedly connected, as at 28, and having the blades clamped therebetween at the threaded connection. The blade 20 is also mounted in a similar manner on a hub 29 fixed on a shaft 30 received in bearing openings 31 provided in the posts 24 and 25. Each end of the hub 29 is cast or otherwise formed to provide bevel gear teeth 32. These gears mesh with a bevel gear 33 provided on the hub 22 and a bevel gear 34 provided on the hub 23. Obviously, in the rotation of the blade 20 by the turning of a hand crank 35 suitably fixed to the shaft 30, the blades 19 and 21 will be turned in unison therewith, the blades 19 and 21 being turned in opposite directions due to the fact that the bevel gears 32 are disposed in oppositely facing relationship, as shown.

Simultaneously with the operation of the cutting blades, the pan 15 is moved endwise by the intermeshing engagement of pinion teeth 36 provided on the hub 22 with rack teeth 37 provided on the flange of one of two angle iron slides 38 suitably riveted or otherwise fixed to the bottom of the pan 15 and operating on the ways 14 provided on the side members 10 of the frame. The pan 15 can be removed at either end of the machine and be put in again with a fresh slab. The end wall 18 of the pan is cut away at the middle thereof, as shown at 39, to receive the blade 20 as the pan is passed thereby.

The slabs received in the pan 15 do not vary in their widths or lengths since they are frozen in standard eight quart molds. However, they frequently vary in height as the mold may be poured too full. In order to insure forming four uniform slabs in the cutting of the slab placed in the pan, I provide a skimming blade 40 mounted on posts 41 fixed to the side members 10 of the frame. The blade 40 extends horizontally over the pan 15 at a predetermined height with respect thereto. In the movement of the pan in advancing the slab to the cutting blades, the blade 40 trims off any excess cream from the top of the slab. The blade 40 is preferably provided with a curved extension 42 in which the cream shavings will be received.

The blades 19, 20, 21, it will be noted, are all radially slotted or kerfed, as at 43. In this way the blade area is divided into a plurality of segments. I have found that the forming of the blade in this way insures a straight, clean cut from end to end of the slab, as each segment is separately resilient and if any particular segment tends to cut askew for any reason, as, for example, by reason of an uneven tapering of one side or the other of the double tapered cutting edge 44, the next segment in entering the cream will continue on the normal line of cut and be unaffected by the deflection of its neighboring segment. To further insure that each segment as it enters the cream will at least start on the same cutting line and not be thrown off by the deflection of the preceding segment, I provide guides 45 for the blades 19 and 21 disposed alongside the pan 15 so as to be immediately alongside the slab 17 carried thereon. The blades 19 and 21 operate in the guides 45 and are thereby held from deflection up or down previous to their entering the slab. If, for example, a segment in passing through the cream is deflected and cuts askew, the next segment which is about to enter the cream will be held by the guides against deflection with the other segment. The cut from end to end of the machine is, therefore, straight, clean and smooth even though the slab is frozen rather hard and would ordinarily be very difficult to cut properly. The guides 45, it will be noted, are provided by forked ends of guards 46 extending laterally around the otherwise exposed portions of the blades 19 and 21. The guards are suitably fastened to the post 41 at one end and to posts 47 at the other end. The latter also provide supports for guides 48 extending parallel with the sides 16 of the pan 15 to keep the upper parts of the slab in place after the cutting operation. A guide 49, similar in its action to the guides 45, is provided for the blade 20 by a slot in the curved extension 42 of the skimming blade 40. The segments of the blade 20, in passing through the guide slot 49, are held against deflection laterally similar to the way in which the segments of the blades 19 and 21 are held against up and down deflection. Thus the vertical cut from end to end of the slab will show no evidences of deviations from a straight line.

It is believed that the foregoing conveys a clear understanding of the objects of my invention and, while I have illustrated but a single working embodiment, it should be understood that various changes might be made in details of construction or arrangement without departing from the spirit and scope of the invention as expressed in the appended claims.

I claim:

1. A slab cutting machine comprising a slab support, a cutting blade mounted for operation on the slab thereon, means for revolving said blade, means to produce relative movement between said support and the blade, and a skimming blade mounted adjacent the edge of the cutting blade and transverse to the plane thereof, said skimming blade being disposed in a certain relation to said support so as to trim the slab to a predetermined dimension and having a slot therein receiving the edge portion of the cutting blade to serve as a guide therefor.

2. A slab cutting machine comprising a support for a slab of material to be cut, a plurality of angularly related cutting blades mounted in a group above the support to operate on the slab from the top and side thereof in transverse planes to divide the same, means for revolving said blades in unison, and means to produce relative movement between said support and said blades.

3. A slab cutting machine comprising a support for a slab of material to be cut, a pair of cutting blades mounted so that each will operate through about half of a certain dimension of the slab, said blades being approximately in the same plane so as to divide the slab in said plane, another cutting blade disposed in a transverse plane to divide the slab in that plane, and means for simultaneously rotating said blades in unison and producing relative movement between said support and said blades.

4. In a slab cutting machine as set forth in claim 3, the provision of a third cutting blade mounted at right angles to the other two blades in a plane between the cutting edges thereof so as to divide the slab in a transverse plane, said blade being revolved simultaneously with the other blades during the relative movement between the support and said blades.

5. In a machine for cutting blocks of material having substantially the characteristics of frozen ice cream, a revolving cutting blade having slots extending inwardly from the cutting edge so as to divide the same into individually resilient segments.

6. In a machine as set forth in claim 5, the provision of a fixed guide for preventing the deflection of the blade segments before the same enter the material being cut whereby to start each segment on a predetermined proper line unaffected by the distortion of a neighboring segment.

7. In a slab cutting machine, the combination with a movable slab support, a rotary cutting blade mounted in a horizontal plane to operate on the slab on said support to divide the same, a rotary cutting blade in a vertical plane for dividing the slab vertically, means for turning said blades in unison, and means for moving said support during the operation of said blades to feed the slab thereto, of a stationary horizontal skimming blade mounted over said support parallel to it and the horizontal blade and in a certain spaced relation to each to trim off the top of the slab to a predetermined desired height during the feeding movement of the slab with said support, said blade having a slot therein receiving the edge of the vertical cutting blade to serve as a guide therefor.

8. A slab cutting machine of the character described comprising a movable support for a slab of material to be cut, a pair of horizontally disposed rotary cutting blades operating in opposite sides of the slab on said support to divide the slab in a horizontal plane, another rotary cutting blade vertically disposed in a plane between the edges of the other two blades to divide the slab in a vertical plane, each of the three blades having slots extending inwardly from the peripheral cutting edge thereof to divide the same into individually resilient segments, means for each of the pair of horizontal blades disposed alongside said support to be alongside the slab carried thereby for preventing deflection up or down of segments of the blades from a normal line before the entering thereof into the slab on said support, and means for the vertical blade disposed above said support over the slab carried thereby for similarly preventing deflection laterally of the blade segments from a normal line before the entry thereof into the slab.

9. A slab cutting machine of the character described comprising a movable support for a slab of material to be cut, a pair of horizontally disposed rotary cutting blades operating in opposite sides of the slab on said support to divide the slab in a horizontal plane, each of the blades having slots extending inwardly from the peripheral cutting edge thereof to divide the same into individually resilient segments, and means for each of the horizontal blades disposed alongside said support to be alongside the slab carried thereby for preventing deflection up or down of segments of the blades from a normal line before the entering thereof into the slab on said support.

10. In a machine as set forth in claim 9, the provision of laterally extending guards about the exposed portions of the peripheries of the cutting blades, the said deflection preventing means being provided by an inturned forked portion at one inner end of each of said guards, the cutting blades being received within said forked ends and thereby having its segments held against deflection.

11. A machine as set forth in claim 9, including a vertical, rotary cutting blade having slots extending inwardly from the peripheral cutting edge thereof to divide the same into individual resilient segments, and a skimming blade horizontally disposed above the slab support in a predetermined spaced relationship therewith for trimming the slab down to a predetermined size in the movement of the slab support, said blade having means for preventing deflection of segments of the vertical blade provided by a slotted extension thereof in the slot of which the vertical cutting blade is received and the segments thereof thereby held against deflection.

12. A machine of the character described comprising a frame, a slab receiving pan mounted for endwise movement on said frame, a vertical revolving cutting blade and a horizontal revolving cutting blade mounted on said frame to operate upon the slab in said pan, a horizontal shaft for turning said vertical blade having a bevel gear thereon, and a vertical shaft for turning said horizontal blade having a bevel gear thereon meshing with the other bevel gear.

13. A machine as set forth in claim 12 including means for operating the pan endwise comprising a gear turning with the last mentioned bevel gear, and a rack fixed to said pan and meshing with said last mentioned gear.

14. A machine of the character described, comprising a frame, a slab receiving pan mounted for endwise movement on said frame, a vertical revolving cutting blade mounted on said frame to operate upon the slab in said pan, means for turning said blade about its horizontal axis, a pair of horizontally revolving cutting blades disposed at opposite sides of said pan to operate upon the slab therein from opposite sides thereof, and means interconnecting the horizontal blades for operation with the vertical blade.

15. A machine of the character described, comprising a frame, a slab receiving pan mounted for endwise movement on said frame, a vertical revolving cutting blade mounted on said frame to operate upon the slab in said pan, means for turning said blade about its horizontal axis, a pair of horizontally revolving cutting blades disposed at opposite sides of said pan to operate upon the slab therein from opposite sides thereof, and means interconnecting the horizontal blades for operation with the vertical blade, said means comprising a pair of oppositely facing bevel gears turning with the vertical cutting blade on a horizontal axis, and a bevel gear for each of the horizontal blades arranged to turn therewith on vertical axes and disposed in intermeshing engagement with the first mentioned bevel gears.

16. A machine of the character described, comprising a frame, a slab receiving pan mounted for endwise movement on said frame, a vertical revolving cutting blade mounted on said frame to operate upon the slab in said pan, means for turning said blade about its horizontal axis, a pair of horizontally revolving cutting blades disposed at opposite sides of said pan to operate upon the slab therein from opposite sides thereof, means interconnecting the horizontal blades for operation with the vertical blade, said means comprising a pair of oppositely facing bevel gears turning with the vertical cutting blade on a horizontal axis, and a bevel gear for each of the horizontal blades arranged to turn therewith on vertical axes and disposed in intermeshing engagement with the first mentioned bevel gears, and means for moving said pan endwise during the operation of said blades, said means comprising a rack fixed to said pan to move therewith, and a gear meshing with said rack and turning with one of the horizontal blades.

17. A machine as set forth in claim 3 including a guard extending about the exposed portion of one or more of said cutting blades, the same having an inturned forked end portion receiving the edge portion of said blade to serve as a guide therefor to hold the same against deflection.

18. A machine as set forth in claim 7 including a guard extending about the exposed portion of the periphery of the rotary horizontal cutting blade, said guard having an inturned forked end portion receiving the edge portion of said blade and serving as a guide therefor to hold the same against deflection.

19. In a slab cutting machine the combination of a base, a pan arranged for endwise movement on said base with a slab of material to be cut, said pan having an upright end wall arranged to engage the slab from behind, a pair of horizontally disposed rotary cutting blades mounted above the pan to cut the slab from opposite sides, a vertically disposed rotary cutting blade above the pan to cut the slab from the top, and means for turning the blades in unison and for simultaneously communicating endwise movement to the pan, the upright end wall of the latter having a vertical slot therein arranged to admit the vertical cutting blade whereby to permit the passage of the pan past the blades.

20. In a slab cutting machine the combination, of a base, a pan arranged for endwise movement on said base with a slab of material to be cut, a pair of horizontally disposed rotary cutting blades mounted above the pan to cut the slab from opposite sides, means for turning the blades in unison and for simultaneously communicating endwise movement to the pan, and a guard for each of said blades extending about the exposed portion thereof, the same having an inturned forked end portion receiving the edge portion of the blade to serve as a guide therefor to hold the same against deflection.

In witness of the foregoing I affix my signature.

SWAN F. ANDERSON.